(12) United States Patent
Cadogan et al.

(10) Patent No.: US 10,377,514 B2
(45) Date of Patent: Aug. 13, 2019

(54) ADJUSTABLE PRESSURE SUIT TORSO

(71) Applicant: ILC DOVER LP, Frederica, DE (US)

(72) Inventors: David Phillip Cadogan, Middletown, DE (US); David Allen Graziosi, League City, TX (US); Greg Jason Muller, Houston, TX (US); Janet G. Ferl, Milton, DE (US)

(73) Assignee: ILC DOVER LP, Frederica, DE (US)

( * ) Notice: Subject to any disclaimer, the term of this patent is extended or adjusted under 35 U.S.C. 154(b) by 649 days.

(21) Appl. No.: 14/614,924

(22) Filed: Feb. 5, 2015

(65) Prior Publication Data
US 2016/0229563 A1    Aug. 11, 2016

(51) Int. Cl.
*B64G 6/00* (2006.01)
*B33Y 80/00* (2015.01)

(52) U.S. Cl.
CPC .............. *B64G 6/00* (2013.01); *B33Y 80/00* (2014.12)

(58) Field of Classification Search
CPC .................... B64G 6/00; B33Y 80/00
USPC ............................................ 2/2.11
See application file for complete search history.

(56) References Cited

U.S. PATENT DOCUMENTS

| | | | | | |
|---|---|---|---|---|---|
| 2,966,155 | A | * | 12/1960 | Krupp | A62B 17/008 128/202.11 |
| 3,534,406 | A | * | 10/1970 | Barthlome | B64G 6/00 2/2.12 |
| 3,636,564 | A | * | 1/1972 | Vykukal | B64G 6/00 2/2.12 |
| 3,660,851 | A | * | 5/1972 | Marroni, Jr. | B64G 6/00 2/115 |
| 3,699,589 | A | * | 10/1972 | Durney | B64G 6/00 2/2.13 |
| 4,369,814 | A | * | 1/1983 | Humphrey | B63C 11/10 138/120 |
| 4,842,224 | A | * | 6/1989 | Cohen | B64G 1/12 244/171.9 |
| 4,887,749 | A | * | 12/1989 | Kosmo | B64G 6/00 223/111 |
| 5,003,630 | A | * | 4/1991 | Bassick | B64D 10/00 2/2.11 |
| 5,068,919 | A | * | 12/1991 | MacKendrick | A62B 17/001 138/155 |

(Continued)

*Primary Examiner* — Richale Quinn
*Assistant Examiner* — Anne Kozak
(74) *Attorney, Agent, or Firm* — Nixon Peabody LLP; Thomas P. Pavelko

(57) ABSTRACT

An Adjustable Pressure Suit Torso, which is a combination of a flexible pressure suit attached to rigid rings, in an assembly of rigid rings and brackets. The rigid rings form openings configured to receive the head, limbs and entry way of a wearer. These rigid rings are attached to one another by brackets, thereby forming an assembly of rigid rings and brackets. The flexible pressure suit is attached to the rigid rings, and otherwise constrained upon pressurization by the rigid ring and bracket assembly. The brackets can be offered in different sizes or made adjustable so as to vary the overall size of the rigid ring and bracket assembly. The flexible pressure suit can be provided in the largest possible wearer size (99$^{th}$ percentile male) and any excess in the flexible suit when donned by a smaller wearer can be folded up while still constrained by the ring and bracket assembly.

19 Claims, 2 Drawing Sheets

(56) References Cited

U.S. PATENT DOCUMENTS

| | | | | |
|---|---|---|---|---|
| 5,318,018 | A * | 6/1994 | Puma | A62B 17/008 |
| | | | | 128/202.11 |
| 5,507,535 | A * | 4/1996 | McKamey | A61M 16/08 |
| | | | | 128/912 |
| 5,697,108 | A * | 12/1997 | Culbertson, Jr. | A62B 17/006 |
| | | | | 2/2.11 |
| 6,256,786 | B1 * | 7/2001 | Dean | B64G 6/00 |
| | | | | 2/2.11 |
| 8,621,662 | B2 * | 1/2014 | Thomas | B64G 6/00 |
| | | | | 2/2.11 |
| 8,914,912 | B2 * | 12/2014 | Stevenson | A41D 13/012 |
| | | | | 2/79 |
| 9,380,814 | B2 * | 7/2016 | Stevenson | A41D 13/012 |
| 9,532,609 | B2 * | 1/2017 | Stevenson | A41D 1/08 |
| 2012/0260388 | A1 * | 10/2012 | Thomas | B63C 11/06 |
| | | | | 2/2.11 |

* cited by examiner

ADJUSTABLE PRESSURE SUIT TORSO

FIELD OF THE INVENTION

The present invention relates to an Adjustable Pressure Suit Torso that is scalable in size and configuration to a wide variety of applications in various types of pressure suits. The invention can be used in creating an enclosure for the upper and lower portions of a person's torso as part of a space suit or pressure suit of any kind.

BACKGROUND OF THE INVENTION

In the past, the torso portion of space suits has either been constructed from mostly flexible materials as in the Mercury, Gemini and Apollo space suits, or from rigid composite shells as in the Space Shuttle or Space station space suits. Both approaches served their purpose well but exhibit limitations that can be improved upon through the hybridization of rigid and flexible materials technologies. The major drawbacks with torsos made from mostly flexible materials are that they take on a cylindrical shape when pressurized that does not match the human body and therefore don't fit perfectly, and they lack redundant safety features because the loads from pressurization and operation pass directly through the flexible materials. Conversely, rigid torsos exhibit excellent structural properties and can be shaped to match the human form, but are heavy and very expensive. Also, rigid torsos have to be made in standard sizes and do not fit a broad population well because of low correlation between various anthropometric measurements within the population. The standard size approach to a rigid torso also has a negative impact on wearer's health because an improper fit and difficulties in donning/doffing and has been proven to cause shoulder injuries.

The Adjustable Pressure Suit Torso of the invention was created to make a step-change in space suit technology that addressed the shortcomings of the available technical approaches and create a new approach that matches future needs in the space program. Future space missions will require improvements in suit performance to improve crew productivity, and logistics to reduce mission cost. The suits will need to be lightweight, fit well, mirror human motion, and provide a high level of safety while pressurized and operating in the harsh environments of space or on planetary surfaces. Perhaps more important to overall mission performance, space suits need to fit a broad population with the fewest number of sizes, be low cost to manufacture and operate, be simple to maintain and repair, and have the lowest overall lifecycle cost possible. For instance, a number of torsos of different sizes must be flown to the International Space Station, stored, maintained, and installed in the suit assembly to accommodate each new astronaut who will fly to the station and perform a spacewalk. The cost of each ounce to orbit and crew cost per minute is in the thousands of dollars range and must be minimized if space travel is to continue or expand.

SUMMARY OF THE INVENTION

The Adjustable Pressure Suit Torso of the invention is a pressure vessel comprised of a rigid space frame that encloses a multi-layered flexible shell which contains the gas. The space frame is defined by the openings required in the torso for the head, limbs and entryway. These interfaces are typically rigid metal or composite rings that act as connection points for other suit components or rotational bearings to provide mobility of the astronaut. The rings are joined into a space frame by brackets which can be made any size, and therefore allow infinite adjustments to the made to the Adjustable Pressure Suit Torso to obtain a perfect fit of the suit to the body. The brackets can be rigid or flexible in nature depending on the stiffness desired in the space frame. They can be attached with screws, clips, cords, loops or other similar methods. Rigid brackets can be manufactured using Additive Manufacturing techniques or with conventional machining, molding or forming techniques. The use of Additive Manufacturing enables components to be manufactured at the point of need, such as on Mars or in earth orbit.

The space frame encompasses the flexible shell that contains the inflation gas. The shell is made up of a bladder, restraint, and a secondary restraint as needed. The bladder is a coated fabric or membrane which contains the gas in the suit. It is assembled from patterns which are joined with standard techniques such as thermal welding or adhesive bonding, or it can be thermo-formed. The restraint is a textile assembly which supports the bladder to keep it unstressed and protected from abrasion, puncture or tear. It is typically made from a woven textile that is sewn from patterned parts, but it can be also be manufactured from a membrane, coated fabric, or a textile made by braiding or other fiber laying method. A secondary restraint can be applied to the exterior of the restraint to create a secondary load path if required. It can consist of a textile net, assembly of webbings, or discrete cords. This layer may also help with control of the excess fabric when the torso is at its minimum size.

The bladder and restraint layers are attached to the perimeter of each of the rigid rings to create a leak-free assembly when the rest of the suit components are attached. The joining of the flexible layers to the rigid rings can be accomplished in a variety of ways including clamping rings with seals, adhesive bonding, compression winding, and lacing.

The space frame ultimately supports the loads imparted in the space suit from pressurization and operation. The inflation gas pressurizes the bladder/restraint assembly and pushes it against the space frame. The stresses in the restraint are very low and therefore improve suit safety because tear resistance is improved.

The bladder and restraint assembly are built to their largest volume required with the largest brackets installed, to accommodate a $99^{th}$ percentile male, for example. As the brackets are replaced with smaller units to fit people in smaller percentile ranges, the bladder and restraint materials simply fold and reside inside the space frame. By selecting the correct combination of brackets the Adjustable Pressure Suit Torso of the invention can be perfectly fit to the person wearing the suit by properly positioning all of the openings (neck ring, scye bearings, entry, etc.) in their ideal location. This creates a single size torso that can accommodate a wide range of the population and limit the number of units that need to be flown to space and maintained over time therefore greatly reducing logistics burden and overall program lifecycle cost.

The Adjustable Pressure Suit Torso of the invention will also improve crew health in comparison to rigid upper torsos with fixed shoulder locations. It is difficult to position the wearer's shoulder joint in the exact center of rotation of a space suit shoulder joint. This sometimes causes stress on the human anatomy that leads to medical anomalies. Simply donning and doffing a rigid torso can also cause significant stress on the shoulder and has been proven to lead to injuries. The Adjustable Pressure Suit Torso of the invention offers the ability to detach various parts such as the shoulder bearings to greatly simplify donning and doffing to eliminate the potential for medical injuries. It also provides the precision required to properly position the shoulder joints to match the human form and eliminate the potential for injury.

In addition to connecting the rings with brackets to create the space frame, independent rigid plates can also be added to the space frame assembly with brackets. Rigid plates can be used to control the shape of the flexible bladder and restraint assembly to closely approximate the shape of the human body. For example, in a space suit without a rear entry door the back there would be a large unsupported area that would try to take the shape of a cylinder when pressurized. The addition of a rigid slightly concave plate on the back connected with brackets to the neck ring, shoulder rings and entryway rings, forces the shape of the back of the suit to closely align with the shape of the body. Ultimately, this improves fit and performance of the wearer in the suit.

The brackets are the key to facilitating an easily sizable torso that can accurately fit a large population. The brackets can be set lengths or they can be adjustable in length. Having adjustable brackets can limit the number required to fit a population, and accommodate fine tuning in sizing. In addition to static brackets which are used to size a suit prior to use, dynamic elements can also be produced to accommodate changing the shape of the suit during use. This may be desirable to best position the suit for a specific operation such as driving a rover when seated, or to reposition the shoulder bearings to improve dexterity in specific movements such as lifting something or reaching overhead. By applying the actuators and control logic from systems such as Hexapods in place of the standard brackets, a torso can be built that can morph into various pre-programmed ideal positions at the push of a button. Similarly, the control system can be driven by sensor inputs that track the position of the body so the torso can reposition itself real-time to match what the wearer is doing.

The Adjustable Pressure Suit Torso technology is applicable to any portion of the torso of a space suit including the chest, waist and brief areas. It is also applicable to any type of pressure suit including space suits, high-altitude flight suits and chemical/biological protective suits. In addition to human worn suits, this technology can also be applied to inflatable robotics.

DETAILED DESCRIPTION OF THE PREFERRED EMBODIMENTS

Figure 1B:
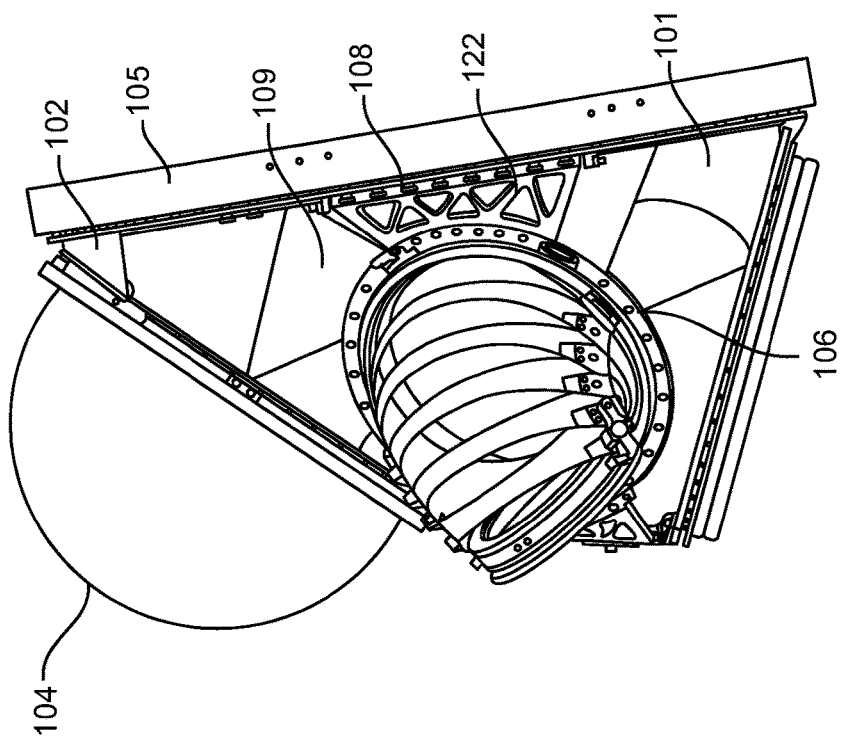
FIG. 1B is a side view of the Adjustable Pressure Suit Torso assembly in a rear-entry upper torso configuration; and, FIG. 2 illustrates the materials in the flexible shell section of the Adjustable Pressure Suit Torso.
Figure 1A:
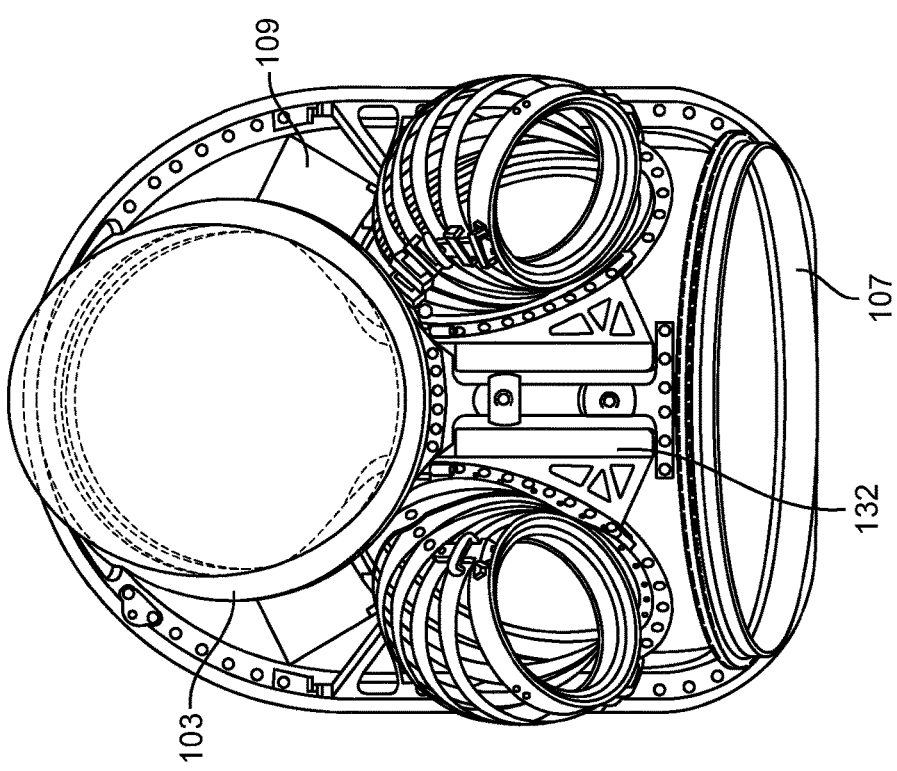
FIG. 1 A is a front view of the Adjustable Pressure Suit Torso assembly in a rear-entry upper torso configuration.
Figure 2:
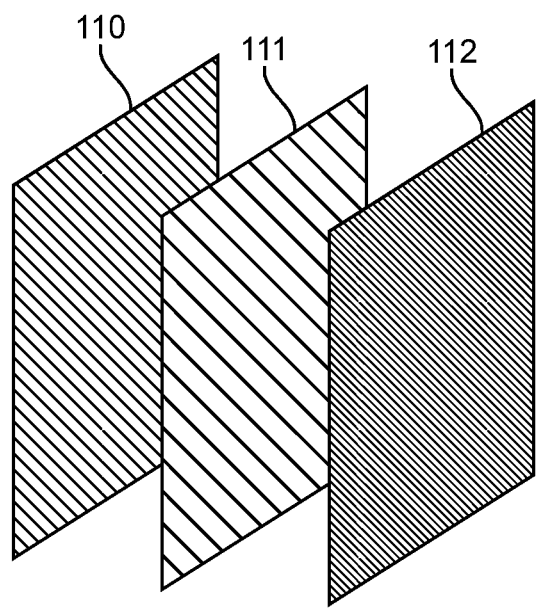

FIGS. 1A and 1B illustrate a front and side view, respectively of the Adjustable Pressure Suit Torso 100 assembly in a rear-entry upper torso configuration. FIG. 2 illustrates the material cross-section of the flexible shell section of the Adjustable Pressure Suit Torso 100.

As shown in FIG. 1, the Adjustable Pressure Suit Torso 100 is comprised of rigid rings including the neck ring 103, the shoulder bearings 106, the waist ring 107, and, depending on the suit configuration, a door frame 105, flexible shell 101, and multiple brackets 102, 122 and 132, with fasteners 108 that join the various rigid rings together. The fasteners 108 that attach the brackets to the rigid rings can be mechanical fasteners, such as screws or similar fasteners to form a rigid frame, or the brackets can be attached to the rings with screws, clips, cords, loops, cables, or similar fasteners to form a flexible frame. The brackets 102, 122, and 132 can vary in shape and size, can be adjustable in size, and can even be dynamically adjustable in size. The brackets 102, 122, and 132 can act as mounting points for equipment, such as display and control monitors, tethers, and tools. The brackets can be of solid structure or formed with holes as shown in bracket 132 in FIG. 1 A, or lattice in structure, such as shown by bracket 122 in FIG. 1 B. The pressurized suit comprises flexible shell 101 for a wearer thereof and the pressurized suit can also be provided with rigid plates 109 to control the shape of the pressurized suit. The plates can be flat or of three-dimensional shape, and can be manufactured from metal, plastic, or composites. The plates can be lightweight by the provision of holes therein or take the shape of rings or lattice structures. The plates can be held to the pressurized suit by rigid brackets or textile based linkages. The technology described herein can be applied to the upper torso (chest) and/or lower torso (waist and brief), either individually or simultaneously.

The flexible shell 101 resides inside the assembly of rigid rings and brackets, and is attached to each individual ring in a leak-free joint. The flexible shell is comprised of a bladder layer 110 that contains the pressurization medium, the restraint 111 that supports and protects the bladder 110, and depending on the configuration, a secondary restraint 112, which provides redundant load paths.

The novel Adjustable Pressure Suit Torso manufactured from the combination of rigid metal, plastic or composite components and flexible textile and membrane materials offers many advantages over primarily soft or primarily rigid approaches to the construction of torso components used in pressure suits, such as space suits or high-altitude flight suits. The Adjustable Pressure Suit Torso comprises a series of rigid ring components forming openings for the limbs and/or head of a wearer to extend into from the torso, rigid brackets that are fixed between the rigid ring components, and flexible materials that span the area between the rings to act as a pressure vessel. The brackets have specific sizes and can be easily exchanged to resize the torso to fit a wide range of users. The loading imparted on the pressure suit from operation or pressurization is reacted by the rigid components. The structure can be made to be lightweight and safe from catastrophic depressurization from punctures or tears because the flexible materials are not highly stressed. The technology can be used on a wide variety of pressure suit configurations including those that are joined at the waist, or enter through a hatch on the back, and can be applied to the upper and/or lower torso areas of the body. The primary advantages of the Adjustable Pressure Suit Torso over conventional rigid or soft torsos used in pressure suits include improved fit which improved mobility and performance of the wearer, a reduced number of sizes required to fit a large population which reduces logistical burden, lower cost to design and produce, improved safety, improves long-term wearer health by reducing shoulder injuries from donning/doffing and operation, reduced mass, and reduced life-cycle cost.

While the present invention has been described in terms of various preferred embodiments thereof, it is to be understood that various modifications, changes, substitutions, omissions, alterations, and the like may be made without departing from the spirit of the invention as set forth in the appended claims.

We claim:

1. An Adjustable Pressure Suit Torso that is scalable in size comprising:
   a rigid space frame, said rigid space frame comprising:
   a plurality of rigid rings, said rigid rings defining openings where the pressure suit torso is configured to connect to the head, limbs, and waist of a wearer of the torso;
   an interchangeable series of brackets, the brackets in said series differing from each other at least in size;
   at least one bracket selected from said series of interchangeable brackets being incorporated into said rigid space frame to create a first spacing of the rigid rings of the head and waist relative to one another; said at least one bracket capable of being interchanged with another bracket from said series of interchangeable brackets to form a second spacing of the rigid rings of the head and waist relative to one another, whereby the first and the second spacings differ from each other; wherein said at least one bracket is interposed between, and directly connected to, the rigid rings of the head and waist by fasteners to form a ring and bracket assembly constraining structure that is configured specifically to fit a person wearing the Adjustable Pressure Suit Torso; and, said Adjustable Pressure Suit Torso further comprising:
   a gas retaining flexible shell that is attached to the rigid rings, and resides inside, the rigid space frame ring and bracket assembly constraining structure, the flexible shell forming an inflatable suit for a person wearing the Adjustable Pressure Suit Torso.

2. The Adjustable Pressure Suit Torso of claim 1, wherein the flexible shell comprises a bladder and a primary restraint.

3. The Adjustable Pressure Suit Torso of claim 2, wherein the bladder is at least one selected from the group consisting of coated fabrics, membranes, and films that retain gas.

4. The Adjustable Pressure Suit Torso of claim 2, wherein the primary restraint comprises an assembly of textiles capable of providing some degree of restraint.

5. The Adjustable Pressure Suit Torso of claim 4, further comprising a secondary restraint applied over the bladder and the primary restraint to provide a secondary load path.

6. The Adjustable Pressure Suit Torso of claim 1, wherein the brackets in the series of interchangeable brackets vary in both shape and size.

7. The Adjustable Pressure Suit Torso of claim 1, wherein the brackets are at least one selected from the group consisting of metal and plastic.

8. The Adjustable Pressure Suit Torso of claim 6, wherein the brackets are manufactured by an additive manufacturing technique.

9. The Adjustable Pressure Suit Torso of claim 6, wherein the brackets are manufactured by one technique selected from the group consisting of machining, casting and molding.

10. The Adjustable Pressure Suit Torso of claim 1, wherein the brackets are attached to the rings with screws to create a rigid assembly.

11. The Adjustable Pressure Suit Torso of claim 1, wherein the brackets are attached to the rings with cords or loops to create a flexible assembly.

12. The Adjustable Pressure Suit Torso of claim 1, comprising a suit configured for the upper torso of a wearer.

13. The Adjustable Pressure Suit Torso of claim 1, further comprising at least one rigid plate in combination with the flexible shell to control the shape of the pressurized suit.

14. The Adjustable Pressure Suit Torso of claim 13, wherein the at least one plate is flat shaped.

15. The Adjustable Pressure Suit Torso of claim 13, wherein the at least one plate comprises one material from the group consisting of metal, composite and plastic.

16. The Adjustable Pressure Suit Torso of claim 13, wherein the at least one plate is lightweight.

17. The Adjustable Pressure Suit Torso of claim 1, wherein the brackets are mounting points for equipment such as display and control modules, tethers and tools.

18. The adjustable Pressure Torso Suit of claim 4, wherein the assembly of textiles is at least one textile selected from the group consisting of woven and braided materials.

19. The Adjustable Pressure Suit Torso of claim 1, further comprising at least two additional brackets selected from said series of interchangeable brackets to change the relative position of at least one of the rigid rings defining an opening for the limbs.

* * * * *